United States Patent
Belsley et al.

(10) Patent No.: US 12,553,992 B2
(45) Date of Patent: Feb. 17, 2026

(54) MULTIPLE-BEAM LIDAR USING A ZOOM LENS

(71) Applicant: DSCG SOLUTIONS, INC., Chantilly, VA (US)

(72) Inventors: Kendall Belsley, Falls Church, VA (US); Richard Sebastian, Frederick, MD (US); James Freal, Arlington, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 1042 days.

(21) Appl. No.: 17/646,536

(22) Filed: Dec. 30, 2021

(65) Prior Publication Data

US 2022/0206124 A1    Jun. 30, 2022

Related U.S. Application Data

(60) Provisional application No. 63/199,476, filed on Dec. 31, 2020.

(51) Int. Cl.
*G01S 7/481*    (2006.01)
*G01S 17/89*    (2020.01)

(52) U.S. Cl.
CPC ......... *G01S 7/4818* (2013.01); *G01S 7/4816* (2013.01); *G01S 17/89* (2013.01)

(58) Field of Classification Search
CPC ....... G01S 7/4818; G01S 7/4816; G01S 17/89
USPC ....................................................... 359/676
See application file for complete search history.

(56) References Cited

U.S. PATENT DOCUMENTS

| | | | |
|---|---|---|---|
| 6,233,045 B1 * | 5/2001 | Suni | G01C 3/08 356/5.1 |
| 2003/0085281 A1 | 5/2003 | Knowles et al. | |
| 2019/0317195 A1 | 10/2019 | Sun et al. | |

FOREIGN PATENT DOCUMENTS

| | | | | |
|---|---|---|---|---|
| JP | 2010158331 A | 7/2010 | | |
| JP | 2020134182 A | 8/2020 | | |
| WO | WO-2017196415 A1 * | 11/2017 | ............ | G01S 17/10 |
| WO | WO-2018128655 A2 * | 7/2018 | ............ | G01S 17/10 |

OTHER PUBLICATIONS

International Search Report and Written Opinion for International Application No. PCT/US2021/073207, mailed on Apr. 20, 2022, 16 pages.
Office Action for Japanese Application No. 2023-540051, dated Nov. 18, 2025, 4 pages.

* cited by examiner

*Primary Examiner* — William Choi
(74) *Attorney, Agent, or Firm* — Brake Hughes Bellermann LLP

(57) ABSTRACT

In one general aspect, an apparatus configured to monitor a distant object can include at least one source of electromagnetic radiation configured to produce a plurality of beams of electromagnetic radiation, and an optical system configured to project each of the plurality of beams of the electromagnetic radiation onto the distant target object, the optical system including a zoom lens having a variable focal length and a controller configured to control the variable focal length of the zoom lens.

19 Claims, 9 Drawing Sheets

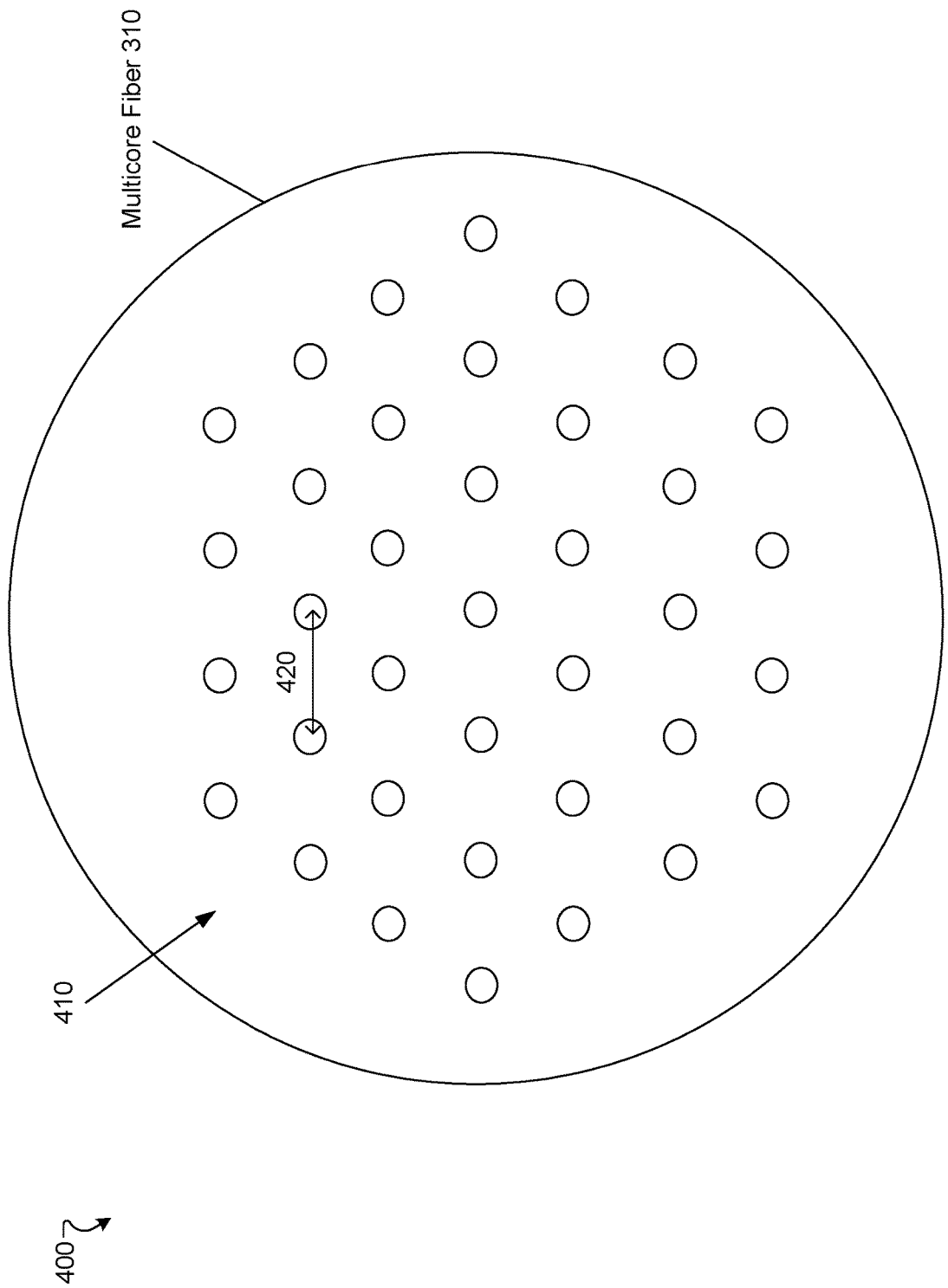

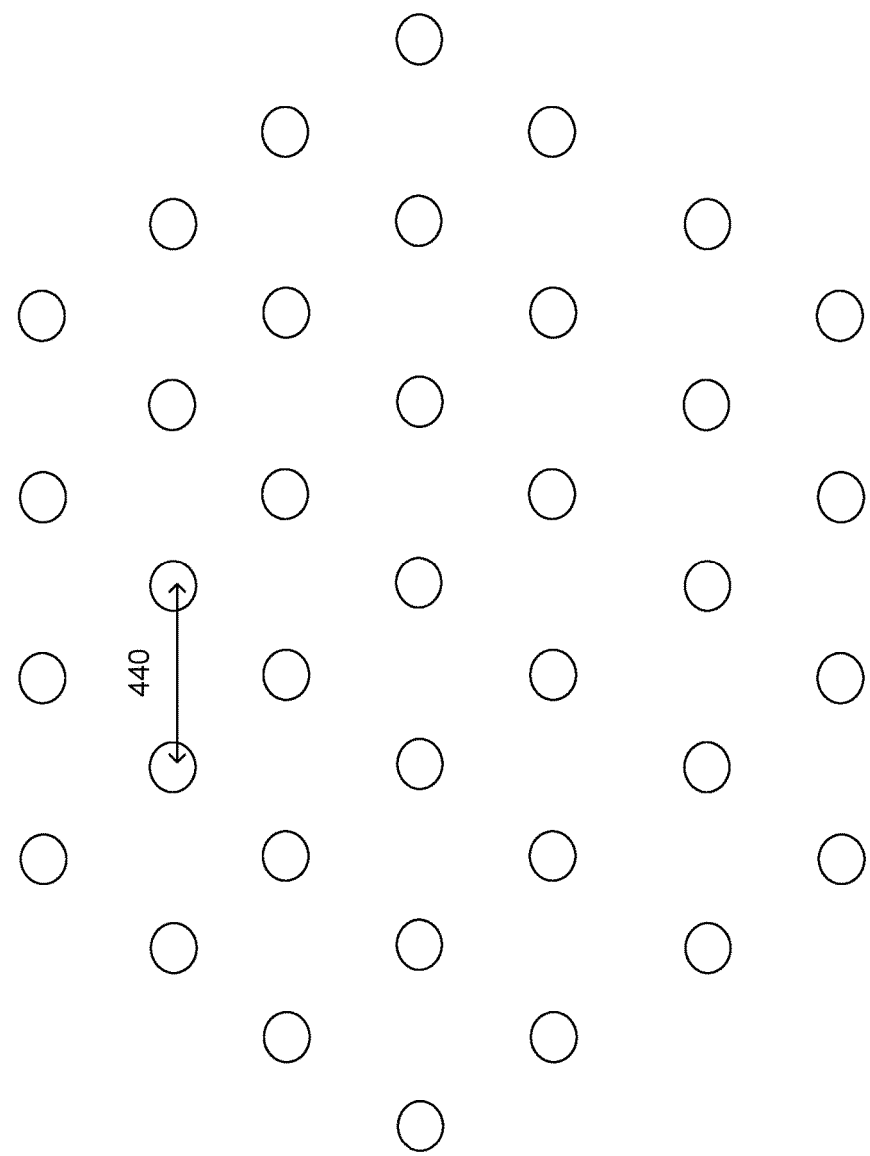

MULTIPLE-BEAM LIDAR USING A ZOOM LENS

RELATED APPLICATION

This application claims priority to U.S. Provisional Patent Application No. 63/199,476, filed on Dec. 31, 2020, entitled "MULTIPLE-BEAM LIDAR USING A ZOOM LENS," the disclosure of which is hereby incorporated by reference in its entirety.

TECHNICAL FIELD

This description relates to a multiple beam laser LIght Detection And Ranging (LIDAR) system that uses a zoom, or variable focal length, optical system.

BACKGROUND

In some known LIDAR systems, lasers may be used to track objects. Some LIDAR systems may also be used to convert object vibrational velocity into audio signals. However, known LIDAR systems used in object tracking and audio signal conversion are often relatively slow, inefficient, and/or inaccurate. Thus, a need exists for systems, methods, and apparatus to address the shortfalls of present technology and to provide other new and innovative features.

SUMMARY

In one general aspect, an apparatus configured to monitor a distant object can include at least one source of electromagnetic radiation configured to produce a plurality of beams of electromagnetic radiation; and an optical system configured to project each of the plurality of beams of the electromagnetic radiation onto the distant target object, the optical system including a zoom lens having a variable focal length and a controller configured to control the variable focal length of the zoom lens.

In another general aspect, a system configured to monitor a distant object can include a transmission subsystem configured to project a plurality of beams of electromagnetic radiation onto the distant target object, the transmission subsystem including a zoom lens having a variable focal length and a controller configured to control the variable focal length of the zoom lens; and an analyzer configured to generate a plurality of velocities based on the plurality of beams of electromagnetic radiation reflected from the distant target object to determine a vibration velocity field over the remote distant object.

In another general aspect, a method can include projecting, through an optical system, a first plurality of beams of the electromagnetic radiation onto a distant target object, the optical system including a zoom lens having a variable focal length and a controller configured to control the variable focal length of the zoom lens; receiving a second plurality of beams of electromagnetic radiation resulting from the first plurality of beams reflected from the distant target object; and analyzing the second plurality of beams of electromagnetic radiation to produce a generate a plurality of velocities and determine a vibration velocity field over the remote distant object.

The details of one or more implementations are set forth in the accompanying drawings and the description below. Other features will be apparent from the description and drawings, and from the claims.

BRIEF DESCRIPTION OF THE DRAWINGS

FIG. 4A is a diagram illustrating an example pattern of multiple beams emitted by a multicore fiber as input into a zoom optical system of a LIDAR system.

FIG. 4B is a diagram illustrating the example pattern in the vicinity of a distant object monitored by the LIDAR system.

DETAILED DESCRIPTION

Figure 1A:
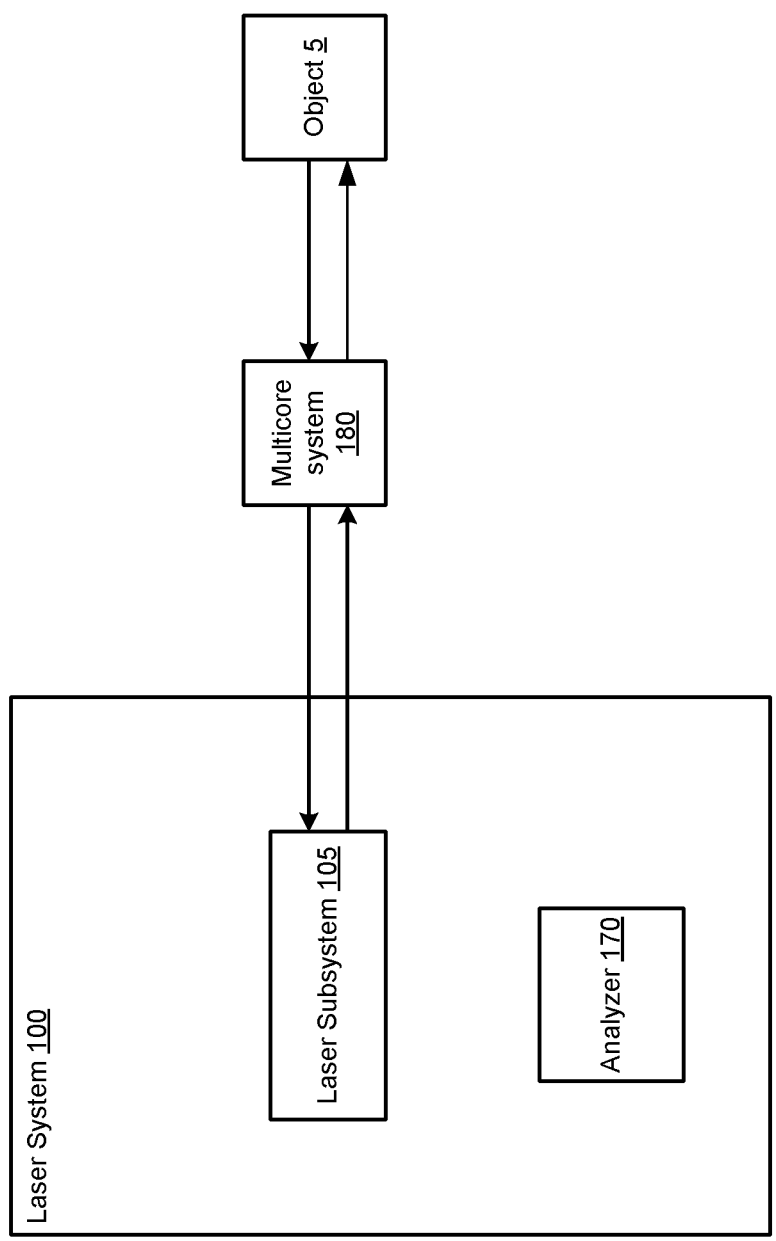
FIG. 1A is a diagram that illustrates a laser system including a laser subsystem.

A multi-beam LIDAR system is configured to generate multiple beams on a target at a particular range such that the beams may have a particular spacing at the target. In some implementations, the multiple beams in a multi-beam LIDAR system are generated from multiple laser subsystems. In some implementations, the multiple beams in a multi-beam LIDAR system are generated from a multi-core fiber.

Multi-beam LIDAR systems can measure range at multiple beam points simultaneously. Along with pointing information these range measurements can be used to provide an (x, y, z) map of a surface for a metrology process. Measurement point spacing is a common requirement for metrology processes. For other LIDAR processes, such as vibration or audio collection, beam spacing is important for multi-channel signal collection or tracking target based on detecting 3D surface geometry.

For a multi-beam LIDAR system the array of LIDAR beam source points is generally fixed for an efficient simple system design. With the efficient fixed spacing beam source array, the LIDAR lens projects the source beam pattern onto the target. If the range to the target is R, the LIDAR lens focal length is rf and the beam spacing is dx, then the beam spacing on the target surface is dX:

$$dX = \frac{R}{rf}dx. \quad (1)$$

Conventional LIDAR systems are generally single beam, particularly in the aerospace and automotive industries. Transition to multibeam systems can speed up and improve accuracy of the metrology part of production processes in these and other industries. Nevertheless, further improvements are possible. For example, a multi-beam LIDAR system used for one metrology application may not be useful in other applications because of the different beam spacing requirements.

In contrast to the conventional LIDAR systems which are unable to adapt to different beam-spacing requirements, improved techniques use a variable-focal length optical system (e.g., a zoom lens) to project a plurality of beams onto a target according to beam spacing requirements. Zoom multi-beam LIDAR systems may be able to adapt to different measurement spacing requirements.

For example, the same system may be used to do both multi-beam vibration measurement and multi-beam 3D imaging for metrology. In addition to applications for measuring a plurality of velocities to determine the velocity field on a distant target, the improved techniques may provide applications for measuring a plurality of ranges which can be used to determine a 3D shape of the distant target. Both applications are optimized in speed and accuracy over beam spacing on the target. The optimal beam spacing for one application is likely different from the optimal beam spacing for the other.

Unlike the conventional LIDAR systems, the improved techniques provide for optimizing beam spacing for any application by adjusting the focal length of a zoom lens. In general, the optimal beam spacing for velocity/audio measurement/detection will be different from the optimal bean spacing for 3D measurement. Having an adjustable focal length zoom lens enables having available optimal target beam spacing for both vibration measurement applications and 3D imaging/3D metrology using a single source beam array.

FIG. 1A is a diagram that illustrates a laser system 100 (also can be referred to as a LIght Detection And Ranging (LIDAR) system) configured to use a laser subsystem 105 to produce or measure ranges and/or velocities of an object 5 that can be stationary or moving with respect to the laser system 100. In some implementations, the laser system 100 can be configured to transmit one or more laser beams. Accordingly, the laser system 100 can be configured to produce an array of beams for, for example, characterization (e.g., measurement) of the object 5. In some implementations, the object 5 can be referred to as a target or as a target object 5. The laser system 100 can be used in frequency modulated continuous wave (FMCW) applications. Such applications can include metrology applications that include the characterization of surfaces (e.g., metal surfaces on vehicles (e.g., airplanes, automobiles, etc.) in a manufacturing environment).

The laser system 100 can implement a multiple beam range measurement process that can, for example, improve the speed and accuracy of range measurements within FMCW applications. As a specific example, a single settling time for the simultaneous use of multiple lasers from the laser system 100 can result in measurement efficiencies over a system with a single laser used multiple times where each use of the single laser is associated with a settling time resulting in multiple settling times. The laser system 100 can also be configured to account for various issues related to vibrations of the object 5 (which can be a rigid body object or a non-rigid body object) that can result in inaccuracies in characterization.

As shown in FIG. 1A, the LIDAR system 100 includes an analyzer 170 configured to analyze data based on laser beams produced by the laser subsystem 105. In some implementations, the analyzing can include estimating a range and/or a velocity for one or more of the laser subsystem 105.

As also shown in FIG. 1A, the LIDAR system 100 includes a zoom optical system 180. The zoom optical system 180 is configured to produce multiple spaced beams at the target 5 through an optical system having any one of multiple focal lengths.

Figure 1B:
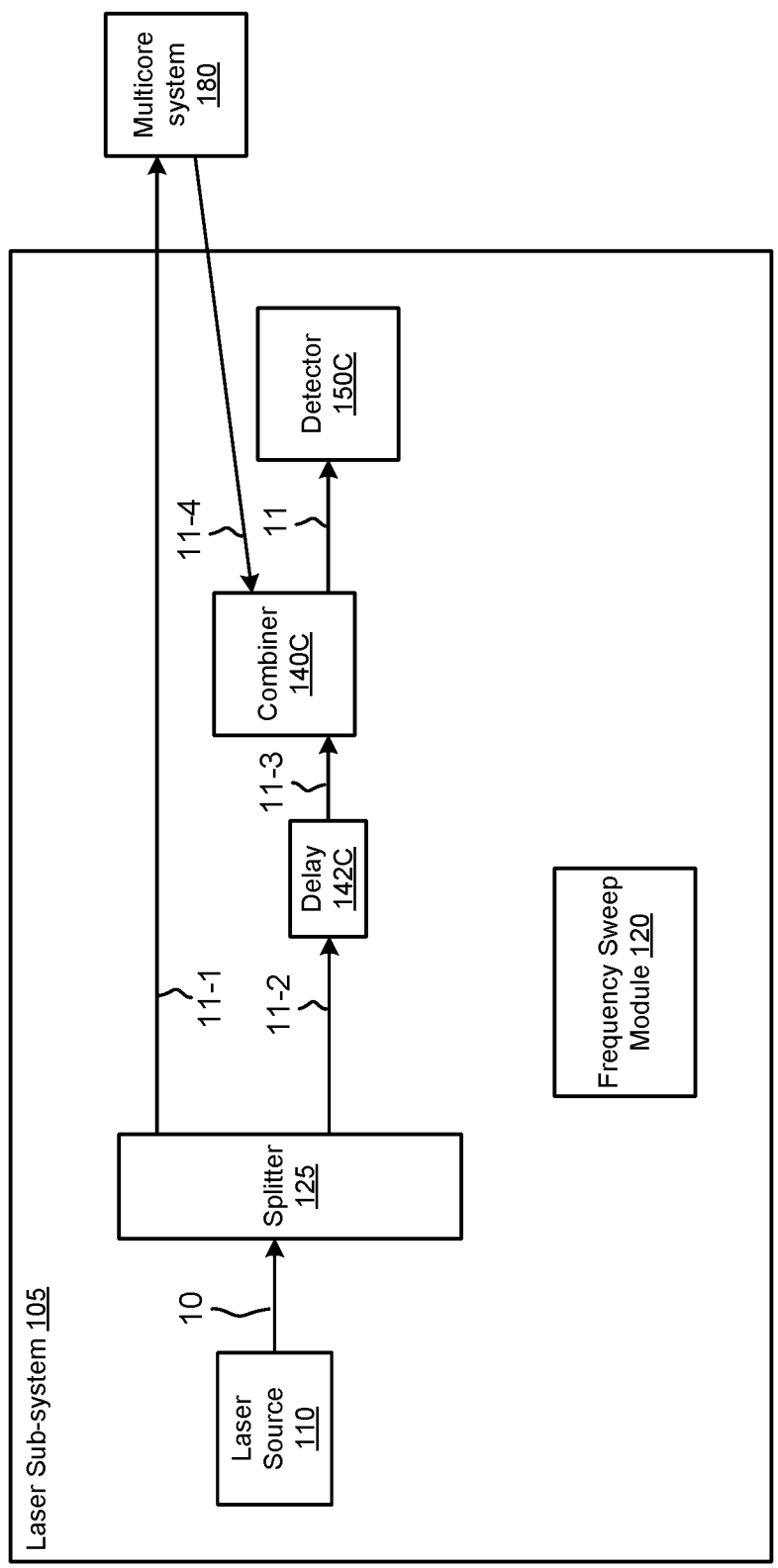
FIG. 1B is a diagram that illustrates, in more detail, components included at least one of the laser subsystems shown in FIG. 1A.

FIG. 1B is a diagram that illustrates, in more detail, components included at least one of the laser subsystems shown in FIG. 1A. The laser source 110 of the laser subsystem 105 is configured to emit (e.g., produce, propagate) electromagnetic radiation at one or more frequencies that can be, for example, a coherent light emission (e.g., monochromatic light emission) or beam. For simplicity, the emissions from the laser source 110 will be referred to as an electromagnetic radiation emission (such as electromagnetic radiation emission), an emitted laser signal 10, or as an emitted light.

As shown in FIG. 1B, the laser signal 10 can be split by the splitter 125 into multiple laser signals such as at least laser signals 11-1 and 11-2. In some implementations, the laser signal 11 can be derived from a split laser signal and can be referred to as combined laser signal. As shown in FIG. 1B, an interferometer can be used to produce the laser signal 11, which may be analyzed for one or more corrections by the analyzer 170 (which can also be referred to as a demodulator) shown in FIG. 1A. In such implementations, the laser signal 10 can be further split (e.g., by splitter 125) into laser signal 11-1 and laser signal 11-2. The laser signal 11-1 can be reflected from the object 5 as laser signal 11-4. Laser signal 11-2 can be delayed by a delay 142C (which can be correlated to a length) to laser signal 11-3 and laser signal 11-3 can be combined with the laser signal 11-4 via a combiner 140C. The laser signal 11 (also can be referred to as an interferometer signal) from the interferometer can be used to gather information about the laser signal 11 using a detector 150C. Discussions related to laser signal 11 below can be applied to any of the component laser signals 11-1 through 11-4 that can be used to define laser signal 11, which can be the target laser signal or the laser signal targeted for analysis by the analyzer 170. The splitter 125 is illustrated as a single component for simplicity. In some implementations, the splitter 125 can include more than one splitter. Similarly, one or more of the combiners shown in FIG. 1B may be combined or may include additional combiners.

As shown in FIG. 1B, the laser subsystem 105 includes a frequency sweep module 120 (which can be used with more than one laser subsystem). The frequency sweep module 120 is configured to trigger the laser source 110 to produce a variety of optical frequencies (also can be referred to generally as frequencies), for example, by modulating a drive current of the laser source 110. Specifically, the frequency sweep module 120 is configured to trigger laser source 110 to produce a pattern of optical frequencies (also can be referred to as a frequency pattern). For example, the frequency sweep module 120 can be configured to trigger the laser source 110 to produce a sinusoidal wave pattern of optical frequencies, a sawtooth wave pattern of optical frequencies, and/or so forth. In some implementations, the sawtooth wave pattern can have a portion continuously increasing (e.g., monotonically increasing, linearly increasing, increasing nonlinearly) in optical frequency (also can be referred to as up-chirp) and can have a portion continuously decreasing (e.g., monotonically decreasing, linearly decreasing, decreasing nonlinearly) in optical frequency (also can be referred to as down-chirp). Accordingly, the frequency pattern can have a cycle including an up-chirp and a down-chirp.

The laser subsystem 105 includes a combiner 140C configured to receive the laser signal 11-4 reflected (also can be referred to as a reflected laser signal or as a scattered laser signal) (not shown) from the object 5 in response to an emitted laser signal 11-1 (split from laser signal 10) from the laser source 110 toward the object 5. In some implementations, the reflected laser signal (also can be referred to as a return signal or return light) from the object 5 can be mixed with a portion of the emitted laser signal 10 (e.g., laser signal 11-3 delayed by delay 142C) and then analyzed by the analyzer 170 (after being converted to an electrical signal by detector 150C).

The analyzer 170 (which can be used with more than one laser subsystem and/or included within one or more of the laser subsystems) of the laser subsystem 105 is configured to analyze a combination of emitted laser signal 11-1 from the laser source 110 and reflected laser signal 11-4 received by the combiner 140C. The emitted laser signal 11-1 can be emitted in accordance with a pattern including an up-chirp followed by a down-chirp (or a down-chirp followed by an up-chirp). The combination of a frequency of the emitted laser signal 11-1 from the laser source 110 and a frequency of the reflected laser signal 11-4 received by the combiner 140C can be analyzed by the analyzer 170 to obtain or define a beat frequency or signal. In other words, the beat frequency can be a sum of a signal frequency change over the round trip to the object 5 (emitted laser signal) and back (reflected laser signal), and may include a Doppler frequency shift of the reflected laser signal resulting from relative range motion between the laser subsystem 105 and the object 5. In some implementations, the beat signal can have a relatively constant frequency or a varying frequency. In some implementations, a combination of a frequency of emitted laser signal 11-1 and a frequency of reflected laser signal 11-4 can be referred to as a difference frequency, a beat frequency or as a round-trip frequency.

The analyzer 170 can be configured to calculate a round-trip time period, which is a time period from the emission of the laser signal 10 to receipt of the return of the reflected laser signal. A combination of the emitted later signal 11-1 and the reflected laser signal 11-4 can collectively be referred to as a round-trip laser signal. The analyzer 170 can also be configured to calculate a range and/or a velocity based on the combination of the emitted laser signal 11-1 and the reflected laser signal 11-4.

The optical power of the laser output can change significantly during a frequency pattern such as a frequency sweep or up-chirp/down-chirp as a result of, for example, drive current modulation of the laser source 110. The frequency pattern may be non-ideal (e.g., may deviate) from a specified frequency pattern because of an imperfect drive current signal, unavoidable thermal excitations in the laser source 110, and/or so forth that can cause variations, for example, frequency, phase, and/or so forth.

A linearly-chirped FMCW LIDAR can calculate a range by determining the frequency of a delayed chirp that has traveled to the target (e.g., object 5) and back relative to the frequency of a chirp that has followed a local oscillator (LO) path within the LIDAR system 100. In some implementations, the LO path can include the path between the splitter 125 and the combiner 140C, which can include laser signal 11-2, the delay 142C, and laser signal 11-3. If the target signal is combined with (e.g., beat against) the LO signal then the frequency of the beat signal will be the difference frequency resulting from the (Range−LO) delay:

$$F = (2*\text{Range} - LO) * HZPM \quad (2)$$

where, F=beat frequency, 2*Range=target round trip path length, LO=local oscillator path length, HZPM=(Hz/sec lidar chirp rate)/c, and c=velocity of light (meters/second).

As shown in FIG. 1B, the LO length is a length correlated to the delay 142C. The Range−LO term can represent a length difference associated with an interferometer signal derived from the laser signal 10. In other words, the range term can be a length associated with the laser signal 10 that may include the distance to a target (e.g., object 5), and may be a round-trip distance, and the LO term can be a length associated with a delayed version of the laser signal 10. Accordingly, the Range−LO can represent a length derived from a beating of the laser signal 10 and a delayed version of the laser signal 10.

If the target has a non-zero velocity component (linear motion or vibration) v in the direction of increasing range, as is generally the case, Eq. (2) becomes:

$$F = (2*\text{Range} - LO) * HZPM + \frac{v}{c} * F0 \quad (3)$$

where F0 is the carrier frequency of the LIDAR laser=c/λ where λ is the laser wavelength. In some implementations, a variation in range and/or velocity that can be tolerated can be calculated using Eq. (3). For example, a variation in range in can be calculated within a particular threshold range based on a variation in velocity using Eq. (3). Accordingly, a tolerance in velocity (e.g., linear motion or vibration) variation can be determined for a given range variation. Similarly, a tolerance in range variation can be determined for a given velocity (e.g., linear motion or vibration) variation.

If the target is vibrating so that v=v(t), we have, to a close approximation:

$$F = (2*\text{Range} - LO) * HZPM + \frac{v}{c} * F0. \quad (4)$$

If multiple simultaneous range measurements are made on a surface in close proximity we will have approximately (if the LO paths are the same and the velocities are the same at each position):

$$F_j(t) = (2*\text{Range}_j - LO) * HZPM + \frac{v}{c} * F0. \quad (5)$$

In some implementations, the close proximity can be, for example, close enough in proximity such that displacement due to vibration at each of the locations associated with the respective range measurements are the same or at least linearly related.

The laser system 100 (and laser subsystem 105A, for example) described above with respect to FIGS. 1A and 1B can result in a variety of efficiencies. For example, in some implementations, frequency at each time point is a sum of components proportional to range and velocity (which can be noise and can be associated with Doppler effects) in the range direction (e.g., range derivative). This concept is expressed in Eqs. (3)-(5) above. These components alternate relative sign between upchirp and downchirp data points. In the absence of, for example, a counter chirp LIDAR architecture, multiple time points are processed to determine range and velocity.

In some implementations, a differential equation can be solved to determine the time histories of range and the range derivative. In some known applications, such as in metrology applications, simple approximations can be made, such as constant velocity, to estimate range and velocity, or to average over time and assume that range is constant and velocity averages to zero. This approach can result in a slow measurement process in environments in which vibration is significant (the significance or tolerance which can be determined using, for example, Eq. (4) as described above). In contrast, the LIDAR system 100 with multiple lasers (e.g., closely-spaced laser beams) can greatly accelerate the measurement process, while yielding significant improvements in relative and absolute range estimates and relative azimuth and elevation estimates.

Specifically, in some implementations of the LIDAR system 100, absolute and relative range accuracy improvement can be implemented because the vibration velocity field can be slowly varying as a function of position. Therefore, the velocity values (e.g., magnitudes) at relatively closely spaced points will be nearly the same or, in the worst case, may be approximated as linearly varying in value as a function of history and/or lateral distance. In some implementations, the velocity values at closely spaced points will be nearly the same or, in the worst case, may be approximated as linearly varying in value as a function of x and y, if z is the Cartesian coordinate in the direction of the LIDAR beams. In some implementations, for a rigid solid object, instantaneous z-velocity can vary exactly linearly as a function of x and y. Therefore, the differential equations to be solved for range and velocity time history at each point can be linked to each other. By solving for the range and velocity fields simultaneously there will be a reduction in error. In some implementations of the LIDAR system 100, a reduction in relative range error between local points can be implemented because the points are measured simultaneously and the possibility of range motion is eliminated. In some implementations, a substantial reduction in relative azimuth and elevation error can exist between local points because the relative azimuth and elevation of these points results from the rigid structure of the multiple beam array of the LIDAR system 100. In some implementations, multiple measurements can be performed simultaneously in the LIDAR system 100, which can result in time or speed efficiencies. For many metrology processes, features can be measured by measuring many relatively closely spaced points. A speed advantage can be obtained by measuring multiple points simultaneously.

In some implementations, the LIDAR system 100 can have multiple beams emanating from the zoom optical system 180 where simultaneous measurements using the multiple beams results in simultaneous estimates of both range and/or velocity at each beam location, and the various beam locations are spatially close enough to have substantially the same velocity (Doppler component). In other words, in some implementations, the LIDAR system 100 can have a first laser beam transmitted at a time at a first location from the zoom optical system 180 and a second laser beam transmitted at the same time from the zoom optical system 180 at a second location where simultaneous measurements calculated using the first and second laser beams result in simultaneous estimates of both range and/or velocity at each of the first and second beam locations, and the first and second beam locations can be spatially close enough such that Doppler shifts for the first and second laser beams may be substantially the same or linearly related. In some implementations, the measurements from the LIDAR system 100 can be processed together by the analyzer 170 to estimate the constant or linearly varying velocity of the surface, and this estimated velocity can be used by the analyzer 170 to correct the range estimates at each of the beam locations.

The zoom optical system 180 can be configured with any of multiple focal lengths. For example, a first metrology process may be configured such that the object to be measured is 1 meter from an egress of the zoom optical system 180 while a second metrology process is configured with an object at 10 cm from the egress of the zoom optical system 180. In this case, a conventional LIDAR system with an optical system having a single focal length may make accurate measurements for the first metrology process but such a single focal length may not lend itself to accurate measurements for the second metrology process. Replacing the optical system with a different optical system having a more appropriate focal length may be costly and prone to damage. In contrast, the improved LIDAR system 100 with a zoom optical system 180 having multiple focal lengths may provide accurate measurements for both the first and second metrology processes. Further details of the zoom optical system 180 are presented with regard to FIGS. 3A-C.

In some implementations, measurements at multiple times can be used by the analyzer 170 to estimate a time history (e.g., evolution) of the ranges and velocities to further improve the estimates of range (and velocity). For example, a first set of simultaneous measurements at a first time can be used by the analyzer 170 with a second set of simultaneous measurements at a second time to produce at least a portion of a time history of ranges and/or velocities. These different sets of simultaneous measurements can be used by the analyzer 170 to further improve estimates of the ranges and/or velocities.

In some implementations, the LIDAR system 100 can be configured such that multiple simultaneous measurements at points at a particular time produced by the LIDAR system 100 can be used by the analyzer 170 to improve relative range between the points at the particular time independent of absolute range accuracy. We can rearrange equation 2 to yield $$\text{Range} = \frac{1}{2}\left(\frac{F}{HZPM} + LO\right) - \frac{v}{c} * \frac{F0}{2HZPM} \qquad (6)$$

for each beam. The relative range for each measurement is the difference between these measurements, so that if v is the same for each beam, then the relative range does not depend on the velocity.

In some implementations, the LIDAR system 100 can be configured such that a rigid physical structure defines the relative positions of the multiple beam array produced by the laser subsystems 105A through 105N of the LIDAR system 100. This known set of relative positions can be used by the analyzer 170 to produce improved relative measurements of x, y, and/or z locations of each of the measured points by the laser subsystems 105A through 105N.

In some implementations, the LIDAR system 100 can have an increased usable data rate because multiple points can be measured simultaneously, each point can have increased absolute accuracy, and/or each point can have increased relative accuracy as described above.

Figure 2A:
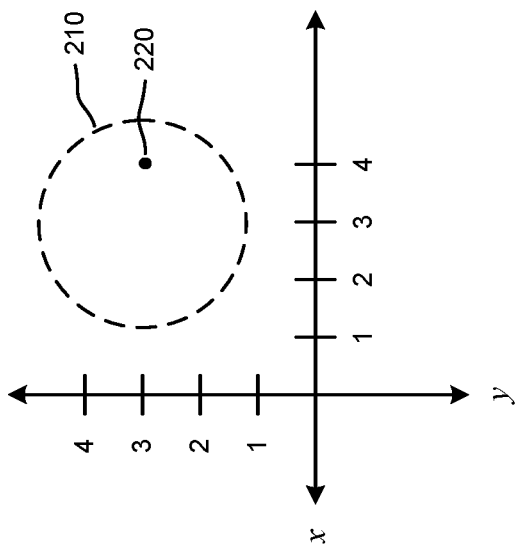
FIG. 2A is a diagram illustrating an example object being tracked within the electronic environment illustrated in FIG. 1.
Figure 2B:
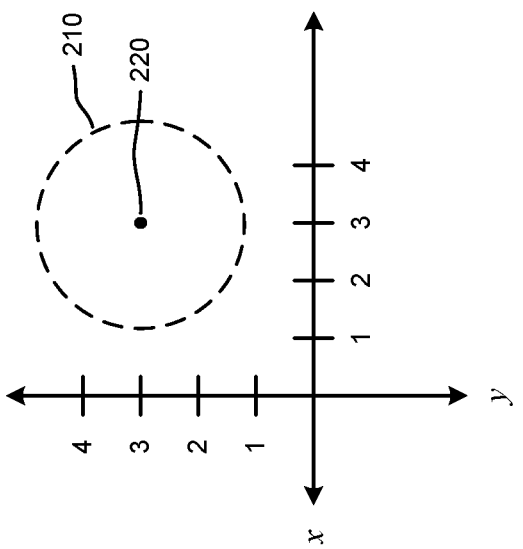
FIG. 2B is a diagram illustrating the example object as tracked within the electronic environment illustrated in FIG. 1.

FIGS. 2A and 2B illustrate an example object 210 that may be observed by (e.g., targeted by) the tracking system 120. The object 210 may have any shape but is represented in FIGS. 2A and 2B as a circle. In FIG. 2A, at time T1 a point 220 on the object 210 is being observed by the tracking system 120. At time T1 the point 220 is located at (3,3) in the (x,y) plane. As illustrated in FIG. 2B, at time T2 the point 220 is located at (4,3) in the (x,y) plane. The movement of the point may be the result of different types of movements of the object 80. For example, the object 220 may have moved from one location to another (translational movement) or the object 220 may have rotated (for example, about an axis parallel to the y axis of the x-y plane).

Figure 2C:
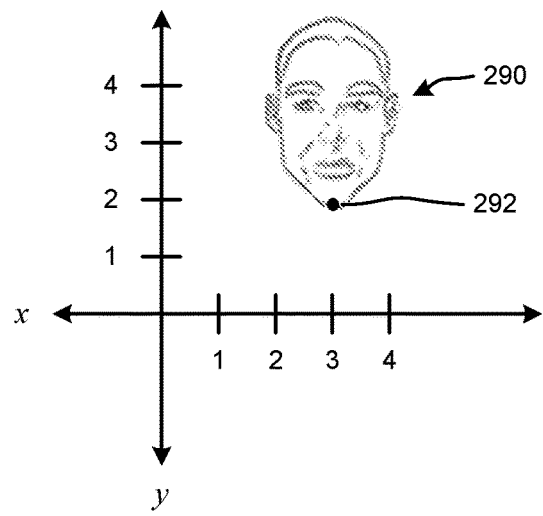
FIG. 2C is a diagram illustrating another example object being tracked within the electronic environment illustrated in FIG. 1.
Figure 2D:
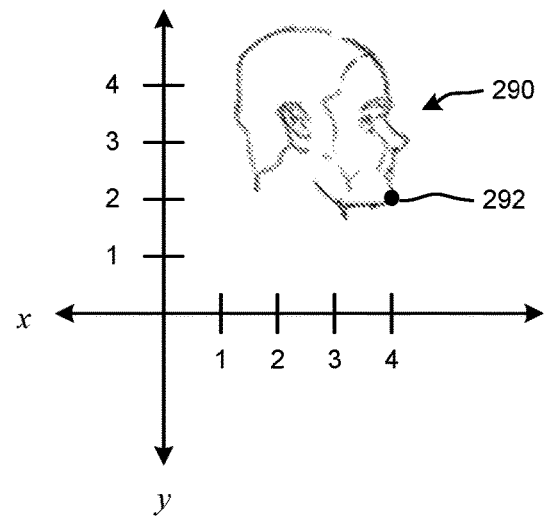
FIG. 2D is a diagram illustrating the other example object as tracked within the electronic environment illustrated in FIG. 1.
Figure 2E:
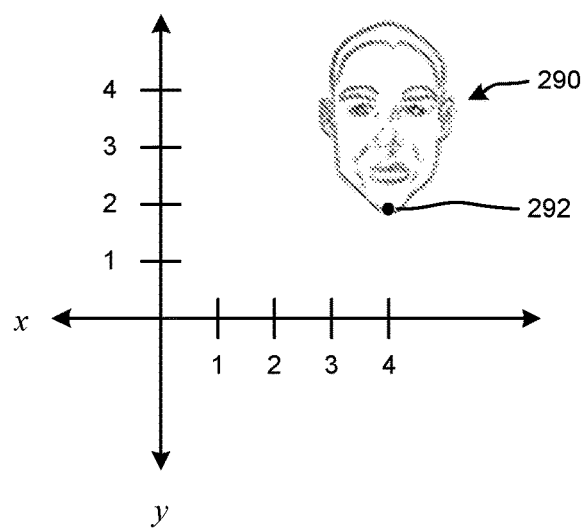
FIG. 2E is a diagram illustrating the other example object as further tracked within the electronic environment illustrated in FIG. 1.

As illustrated in FIGS. 2C, 2D, and 2E a head or face 290 of an individual may be tracked or observed by the tracking system 120. Specifically, a point or location 292 of the head or face 290 may be observed. As illustrated in FIG. 2C, at time T1 the point 292 is located at (3,2) in the (x,y) plane. At time T2 the point 292 may be observed to be at (4,2). The movement of the point may be the result of different types of motion. For example, the person or individual may have rotated their head (for example, about an axis parallel to they axis), as illustrated in FIG. 2D. Alternatively, the person or individual may have moved their head (without any rotation), as illustrated in FIG. 2E.

Some LIDAR-based monitoring systems use a single-beam dwell for vibration collection and audio rendering. Nevertheless, such a LIDAR-based monitoring system may be excessively sensitive to noise and target motion. To reduce the effect of noise, arrays of beams may be used to detect vibrations from an area of a target. In such arrays, however, there may be some signal degradation due to a beam separation larger than a coherence length of the vibrations. In contrast, the improved LIDAR-based system uses a zoom optical system 180 to generate an array of beams. The zoom optical system 180 can produce an array of beams whose separation is far smaller than a coherence length, thus producing vibration signals with an improved signal-to-noise ratio; these beams may be produced at different focal lengths so that the beams may provide accurate monitoring and/or tracking at various ranges.

Figure 3A:
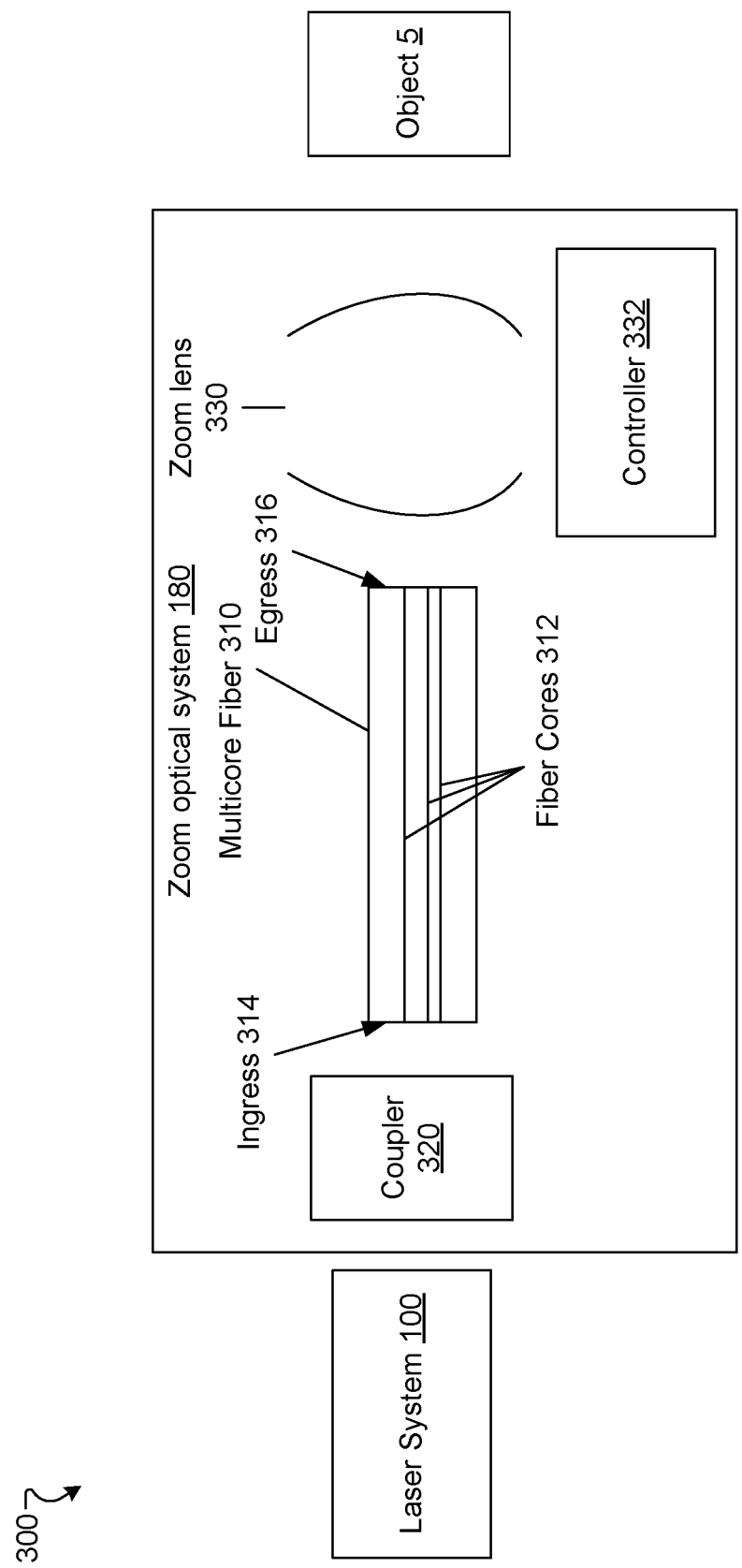
FIG. 3A is a diagram illustrating an example LIDAR system that generates multiple beams for input at an ingress of a zoom optical system.

FIG. 3A is a diagram illustrating an example LIDAR system 300 that generates multiple beams for input at an ingress of a zoom lens 330. The zoom optical system 180, as illustrated in FIG. 3, includes a multicore fiber 310, a coupler (or first optical system) 320, and a zoom lens 330. In some implementations, the LIDAR system 300 may generate multiple beams in an alternative way, e.g., using multiple laser subsystems.

The multicore fiber 310 is configured to accept electromagnetic radiation from the coupler 320 at an ingress 314 and transport the electromagnetic radiation to an egress 316. The multicore fiber 310 includes a plurality of fiber cores 312, each of which deliver the electromagnetic radiation via total internal reflection from the ingress 314 of the multicore fiber 310 to its egress 316. In some implementations, each of the fiber cores is 312 a single-mode fiber. In some implementations, each of the fiber cores is polarization maintaining.

The zoom lens 330 is configured to image the multiple beams in a vicinity of any number of target objects, at various ranges, to be monitored and/or tracked. Further details of the zoom lens 330 are shown with regard to FIGS. 3B-C.

Figure 3B:
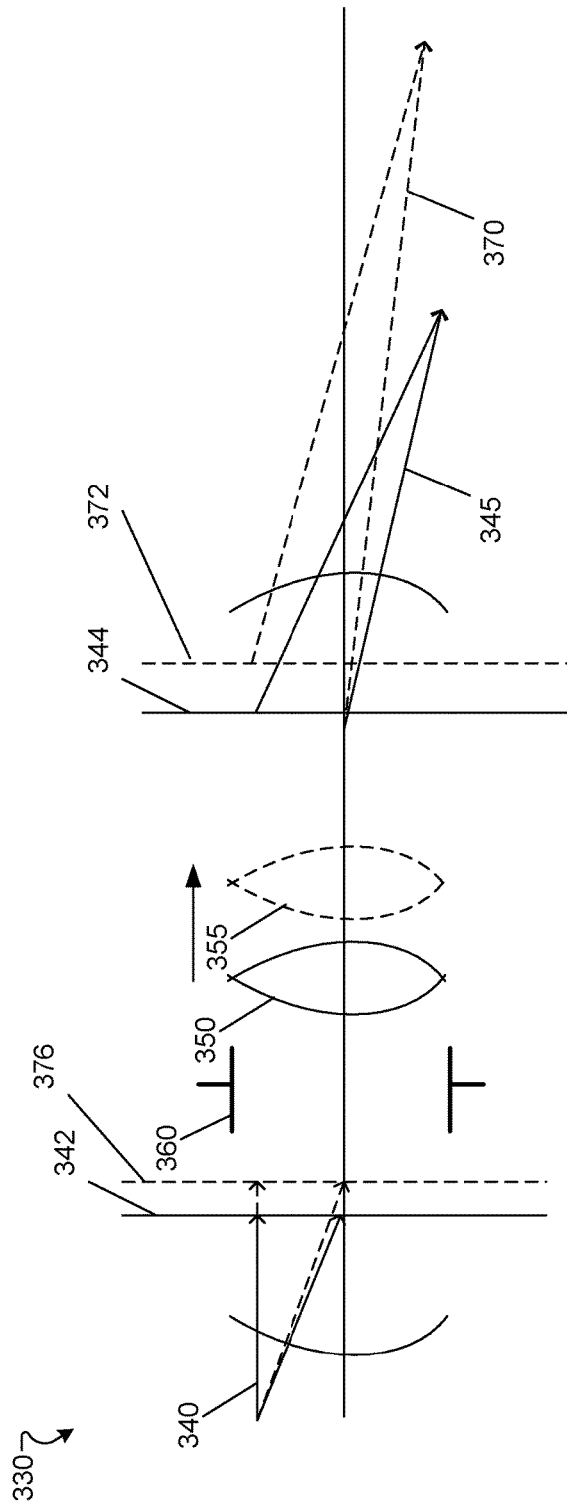
FIG. 3B is a diagram illustrating an example zoom lens in which the focal length is varied by moving a thin lens along an optical axis of the zoom optical system.

FIG. 3B is a diagram illustrating an example zoom lens in which the focal length is varied by moving a thin lens 350 with stop 360 along an optical axis of the zoom lens 330. For example, in some implementations, in response to an indication that the focal length of the zoom lens 330 is to be adjusted, a controller 326 performs an adjustment of the focal length of the zoom lens 330 by moving a position of the thin lens 350 along the optical axis. In some implementations, the controller 332 moves the thin lens 350 to one of a fixed number of discrete positions along the optical axis, corresponding to a respective focal length. In some implementations, the thin lens 350 may be mounted on a movable mount that is attached to a piezoelectric transducer.

As shown in FIG. 3B, a ray bundle 340 is incident on the zoom lens; the effective ingress of the zoom lens 330 may be at an object-side principal plane 342 and the effective egress of the zoom lens 330 is at an image-side principal plane 344. The image-side ray bundle 345 then forms an image at location 346. In response to an indication that a target is in a vicinity of location 374, the controller may adjust the focal length of the zoom lens 330. In adjusting the focal length of the zoom lens 330, the controller 326 may change the principal planes 342 and 344 to new principal planes 376 and 372, respectively, as the principal planes of an optical system depend on all parameters of the zoom lens 330 (e.g., lens element surface locations and radii).

In some implementations, the controller 332 may adjust the position of the thin lens 350 to the position 355 in a continuous fashion, i.e., the focal length of the zoom lens 330 may vary continuously from a minimum to a maximum. In some implementations, the position 355 is one of a discrete set of possible positions of the lens 350 along the optical axis.

In some implementations, when the focal lengths of the zoom lens are a discrete set, the controller 332 adjusts the focal length of the zoom lens 330 according to a metric. In some implementations, the controller 332 may select a focal length based on the difference between the specified range and a predicted image position at each of the set of focal lengths. In some implementations, the controller 332 may select a focal length based on a difference between predicted images at the specified focal length and at each of the focal lengths. In some implementations, the difference may be an average difference between the complex amplitudes of the images over a region of the image plane.

Figure 3C:
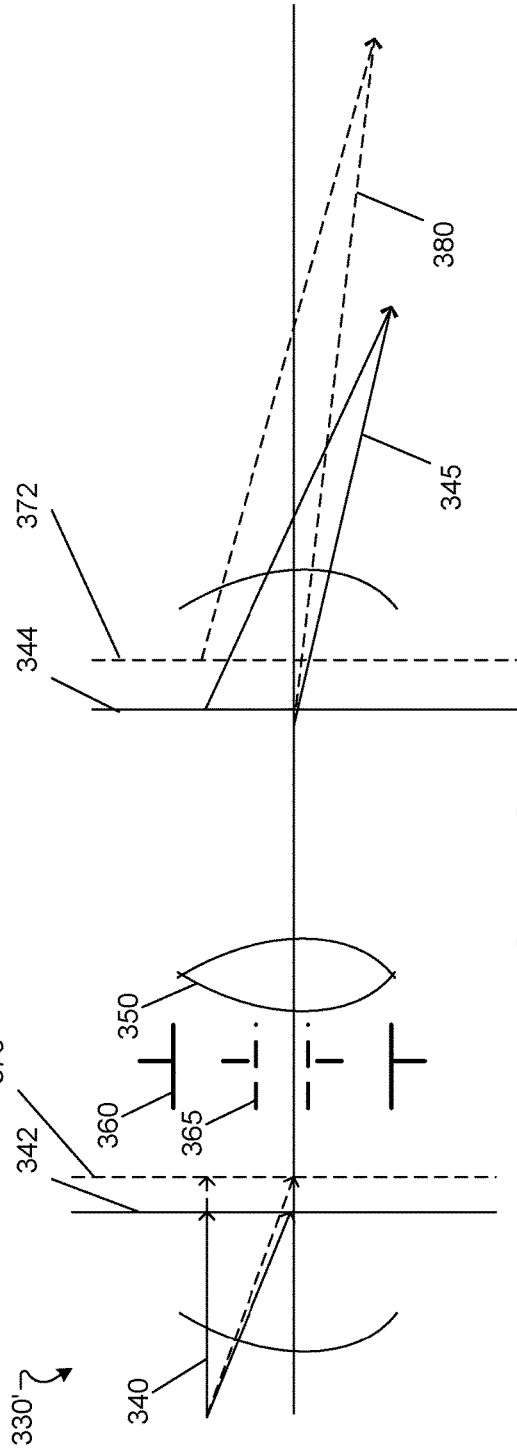
FIG. 3C is a diagram illustrating an example zoom lens in which the focal length is varied by changing the stop size and/or location within the zoom optical system.

FIG. 3C is a diagram illustrating an example zoom lens 330 in which the focal length is varied by changing the stop 360 size and/or location within the zoom lens 330. As shown in FIG. 3C, the stop 360 may be tamped down (i.e., have a smaller diameter); in some implementations, the stop 360 may be expanded (i.e., have a larger diameter). A change in diameter of the stop 360 to the diameter of the stop 365 may change the focal length of the zoom lens 330. In some implementations, however, the controller 332 moves the position of the stop 360 to a different position along the optical axis in response to a request to adjust the focal length of the zoom lens 330. In some implementations, the controller may change the diameter and/or position of the stop in discrete steps.

FIG. 4A is a diagram illustrating an example pattern of multiple beams emitted by a multicore fiber 310 as input into a zoom optical system of a LIDAR system. As shown in FIG. 4A, the beams emitted from the multicore fiber 310 are arranged in a pattern. This pattern illustrated in FIG. 4A is but one example and the improved LIDAR system disclosed herein is not limited to such a pattern. The pattern may be designed to maximize the number of beams within a vibrational coherence length. The pattern may be designed to cover a large enough area on the target to allow for effective tracking of target motion based on the LIDAR signals.

As shown in FIG. 4A, the beams emitted from the multicore fiber 310 are arranged in a regular polygonal pattern with a spacing 420, in this case a hexagonal pattern, although other shapes are possible (e.g., triangular, rectangular, pentagonal, septagonal, octagonal, and so on). This pattern illustrated in FIG. 4A is but one example and the improved LIDAR system disclosed herein is not limited to such a pattern. The pattern may be designed to maximize the number of beams within a vibrational coherence length. The pattern may be designed to cover a large enough area on the target to allow for effective tracking of target motion based on the LIDAR signals.

FIG. 4B is a diagram illustrating the example pattern 430 in the vicinity of a distant object monitored by the LIDAR system, based on the pattern 420 of beams input to the zoom lens 330. As shown in FIG. 4B, the beams remain in a hexagonal pattern and have a spacing 440. The spacing 440 depends on the image quality provided by the zoom lens 330. In some implementations, the controller 332 determines the focal length of the zoom lens 330 by considering the spacing 440 relative to the spacing 420.

In some implementations, the zoom optical system 300 is configured to image a pattern of beams (i.e., pattern 410) onto a target surface. For example, a target surface in the vicinity of the object that is monitored and/or tracked may be selected so that the image of the beams is optimized, e.g., for sharpness.

Returning to FIG. 3, the coupler (i.e., first optical system) 320 is configured to couple light from the laser system 100 into each fiber core 312 at the ingress 314 of the multicore fiber 310. In some implementations, the coupler 320 outputs beams of electromagnetic radiation that has a divergence angle about equal to the numerical aperture of each fiber core 312.

The optical system (i.e., second optical system) 330 is configured to direct the electromagnetic radiation emanating from each of the fiber cores 312 at the egress 316 of the multicore fiber 310 into substantially parallel beams directed to the target 5. Because the beams result from emanation of the electromagnetic radiation from fiber cores 312 in the multicore fiber 310, the beams will be significantly closer together (i.e., are a smaller coherence distance from each other) than conventional LIDAR systems using multiple lasers to generate a group of beams at the target 5.

In some implementations, the optical system 330 includes a collimating optical system configured to direct the electromagnetic radiation from the egress 316 of the multicore fiber 310 in a direction parallel to an axis toward the distant target 5. In some implementations, the axis is directed to a particular point or region on the target 5. In some implementations, the axis is configured to track the target 5 as it moves. In some implementations, the collimating optical system of the optical system 330 has a numerical aperture about equal to the numerical aperture of each fiber core 312.

In some implementations, the optical system 330 includes an optical system configured to focus the electromagnetic radiation from the egress 316 of the multicore fiber 310 onto the distant target 5, i.e., the end of the multicore fiber is imaged onto the target. In some implementations, the optical system 330 is configured to form an image on the target 5.

Figure 5:
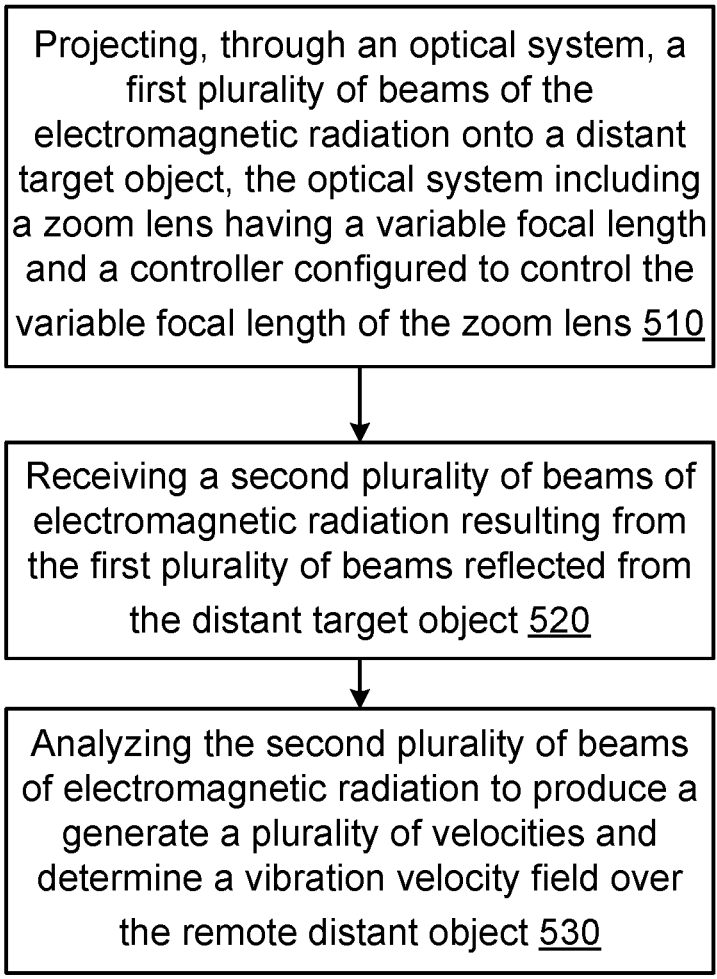
FIG. 5 illustrates a process related to the embodiments described herein.

FIG. 5 illustrates a process 500 related to the embodiments described herein. As shown in FIG. 5, at 510 laser system 100 projects, through an optical system, e.g., zoom optical system 300, a first plurality of beams, e.g., beams 11-1, of the electromagnetic radiation onto a distant target object, e.g., object 5, the optical system including a zoom lens, e.g., zoom lens 330, having a variable focal length and a controller, e.g., controller 326, configured to control the variable focal length of the zoom lens.

At 520, a second plurality of beams, e.g., beams 11-4, of electromagnetic radiation resulting from the first plurality of beams reflected from the distant target object is received, e.g., at detector 150C.

At 530, the second plurality of beams of electromagnetic radiation is analyzed, e.g., by analyzer 170, to produce a generate a plurality of velocities and determine a vibration velocity field over the remote distant object.

In some implementations, one or more portions of the components shown in, for example, the laser system 100 in FIGS. 1A and 1B can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the laser subsystem 105 can be, or can include, a software module configured for execution by at least one processor (not shown). In some implementations, the functionality of the components can be included in different modules and/or different components than those shown in FIGS. 1A and 1B.

In some embodiments, one or more of the components of the laser subsystem 105 can be, or can include, processors configured to process instructions stored in a memory. For example, the analyzer 170 (and/or a portion thereof) can be a combination of a processor and a memory configured to execute instructions related to a process to implement one or more functions.

Although not shown, in some implementations, the components of the laser subsystem 105 (or portions thereof) can be configured to operate within, for example, a data center (e.g., a cloud computing environment), a computer system, one or more server/host devices, and/or so forth. In some implementations, the components of the laser subsystem 105 (or portions thereof) can be configured to operate within a network. Thus, the laser subsystem 105 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the laser subsystem 105.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An apparatus configured to monitor a distant object, the apparatus comprising:
   at least one source of electromagnetic radiation configured to produce a plurality of beams of electromagnetic radiation; and
   an optical system configured to project each of the plurality of beams of the electromagnetic radiation onto the distant object, the optical system including a zoom lens having a variable focal length and a controller configured to control the variable focal length of the zoom lens, at least one of the plurality of beams of the electromagnetic radiation is delivered to the zoom lens via an optical fiber, a numerical aperture of the optical system is based on a numerical aperture of the optical fiber.

2. The apparatus as in claim 1, wherein the plurality of beams are generated using a multicore fiber.

3. The apparatus as in claim 1, wherein the plurality of beams are generated using multiple laser subsystems.

4. The apparatus as in claim 1, wherein the plurality of beams are generated using multiple optical fibers arranged in a fixed spatial pattern.

5. The apparatus as in claim 1, wherein the zoom lens has a discrete number of focal lengths, and the controller is configured to set the variable focal length of the zoom lens to one of the discrete number of focal lengths and no other focal length.

6. The apparatus as in claim 1, wherein the controller configured to control the variable focal length of the zoom lens is further configured to perform an automated zoom adjustment based on at least one criterion.

7. The apparatus as in claim 6, wherein the at least one criterion includes a sharpness measure of the plurality of beams of the electromagnetic radiation onto a distant object, evaluated in a vicinity of the distant object.

8. The apparatus as in claim 6, wherein the at least one criterion includes a deviation from a minimum beam spacing of the plurality of beams of the electromagnetic radiation onto a distant object, evaluated in a vicinity of the distant object.

9. The apparatus as in claim 6, wherein the at least one criterion includes a measure based on a deviation of a geometrical arrangement of the plurality of beams of the electromagnetic radiation on the distant object, from a specified geometrical arrangement.

10. A system configured to monitor a distant object, the system comprising:
- a transmission subsystem configured to project a plurality of beams of electromagnetic radiation onto the distant object, the transmission subsystem including a zoom lens having a variable focal length and a controller configured to control the variable focal length of the zoom lens, at least one of the plurality of beams of the electromagnetic radiation is delivered to the zoom lens via an optical fiber, a numerical aperture of the transmission subsystem is based on a numerical aperture of the optical fiber; and
- an analyzer configured to generate a plurality of velocities based on the plurality of beams of electromagnetic radiation reflected from the distant object to determine a vibration velocity field over the distant object.

11. The system as in claim 10, wherein the plurality of beams are generated using a multicore fiber.

12. The system as in claim 10, wherein the plurality of beams are generated using multiple laser subsystems.

13. The system as in claim 10, wherein the plurality of beams are generated using multiple optical fibers arranged in a fixed spatial pattern.

14. The system as in claim 10, wherein the zoom lens has a discrete number of focal lengths, and the controller is configured to set the variable focal length of the zoom lens to one of the discrete number of focal lengths and no other focal length.

15. The system as in claim 10, wherein the controller configured to control the variable focal length of the zoom lens is further configured to perform an automated zoom adjustment based on at least one criterion.

16. The system as in claim 10, wherein the analyzer configured to generate a plurality of velocities based on the plurality of beams of electromagnetic radiation reflected from the distant object is further configured to generate the plurality of velocities based on a subset of the plurality of beams of electromagnetic radiation reflected from the distant object.

17. A method, comprising:
- projecting, through an optical system, a first plurality of beams of electromagnetic radiation onto a distant object, the optical system including a zoom lens having a variable focal length and a controller configured to control the variable focal length of the zoom lens, at least one of the first plurality of beams of the electromagnetic radiation is delivered to the zoom lens via an optical fiber, a numerical aperture of the optical system is based on a numerical aperture of the optical fiber;
- receiving a second plurality of beams of electromagnetic radiation resulting from the first plurality of beams reflected from the distant object; and
- analyzing the second plurality of beams of electromagnetic radiation to produce a generate a plurality of velocities and determine a vibration velocity field over the distant object.

18. The method as in claim 17, wherein projecting the first plurality of beams of the electromagnetic radiation onto the distant object includes:
- adjusting the variable focal length of the zoom lens based one criterion.

19. The method as in claim 18, wherein the criterion includes a sharpness measure of the second plurality of beams of the electromagnetic radiation onto a distant object, evaluated in a vicinity of the distant object.

* * * * *